United States Patent
Lu et al.

(10) Patent No.: US 7,195,454 B2
(45) Date of Patent: Mar. 27, 2007

(54) BULLNOSE STEP TURBINE NOZZLE

(75) Inventors: Wenfeng Lu, Mason, OH (US);
Ching-Pang Lee, Cincinnati, OH (US);
Nicholas Charles Palmer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 11/002,570

(22) Filed: Dec. 2, 2004

(65) Prior Publication Data

US 2006/0120864 A1 Jun. 8, 2006

(51) Int. Cl.
*F03B 1/04* (2006.01)
*F03B 3/16* (2006.01)

(52) U.S. Cl. .................... 415/181; 415/209.4

(58) Field of Classification Search .............. 415/185, 415/188, 189, 181, 209.4, 139
See application file for complete search history.

(56) References Cited

U.S. PATENT DOCUMENTS 4,135,857 A 1/1979 Pannone et al.
5,020,970 A 6/1991 Dussourd et al.
6,158,961 A 12/2000 Kehl et al.
6,261,053 B1 7/2001 Anderson et al.
6,579,061 B1 6/2003 Heyward et al.
6,672,832 B2 1/2004 Leeke et al.
6,783,323 B2 * 8/2004 Shiozaki et al. ............ 415/115

FOREIGN PATENT DOCUMENTS

JP 58-162702 9/1983

* cited by examiner

*Primary Examiner*—Edward K. Look
*Assistant Examiner*—Dwayne J White
(74) *Attorney, Agent, or Firm*—William S. Andes; Francis L. Conte

(57) ABSTRACT

A turbine airfoil includes opposite pressure and suction sides extending in span from a flowpath surface. The flowpath surface has chordally opposite forward and aft edges and laterally opposite first and second endfaces corresponding with the airfoil pressure and suction sides. The flowpath surface joins the first endface at the forward edge in a forward bullnose and joins the second endface at the aft edge in an aft bullnose, with the bullnoses varying in radius from the opposite edges.

21 Claims, 5 Drawing Sheets

BULLNOSE STEP TURBINE NOZZLE

BACKGROUND OF THE INVENTION

The present invention relates generally to gas turbine engines, and, more specifically, to turbine flowpaths therein.

In a gas turbine engine, air is pressurized in a compressor and mixed with fuel in a combustor for generating hot combustion gases. Energy is extracted from the hot gases in turbine stages for powering the compressor and producing output work in driving an upstream fan in a turbofan aircraft engine application, or in powering an external drive shaft for marine and industrial applications.

A high pressure turbine (HPT) immediately follows the combustor outlet and includes a stationary turbine nozzle followed in turn by a row of turbine rotor blades extending radially outwardly from the perimeter of a supporting disk. The HPT may include more than one stage and drives the rotor supporting the compressor rotor blades.

A low pressure turbine (LPT) follows the HPT and typically includes several stages of turbine nozzles and cooperating rows of rotor blades. The LPT drives the fan, or the external drive shaft.

Each of the turbine nozzles includes a row of stator vanes having corresponding airfoil configurations including generally concave pressure sides and opposite, generally convex suction sides extending axially in chord between opposite leading and trailing edges. The vane airfoils also extend in radial span between radially inner and outer bands or flow confining platforms which define the individual flow passages between adjacent vanes.

Similarly, each turbine rotor stage includes a row of turbine blades having integral dovetails mounted in complementary dovetail slots in the perimeter of the supporting rotor disk. Each rotor blade includes an airfoil portion extending radially outwardly from the dovetail at an intervening flow-bounding platform disposed at the root of the airfoil.

Each row of turbine blades is surrounded by a corresponding annular turbine shroud which provides a small clearance or gap above the radially outer tips of the blades to confine the combustion gases to flow in the individual flowpaths between adjacent turbine airfoils.

Since the first stage nozzle of the HPT first receives the hottest combustion gases from the combustor it is subject to substantial thermal expansion and contraction during operation. In order to reduce thermally induced stresses during operation, the turbine nozzle is circumferentially segmented into singlets of individual vanes and corresponding band segments, or doublets of two vanes supported in corresponding band segments.

The nozzle segments are suitably mounted together in an annular ring and have corresponding endfaces which define the circumferential joints therebetween in the form of axially extending splitlines. Each endface includes an axial slot therein which receives a spline seal for sealing the splitlines. In this way, the segmented annular nozzle is free to expand and contract during operation at the corresponding axial splitlines for minimizing thermally induced stress therein.

Similarly, each turbine rotor blade is individual mounted in a corresponding dovetail in the perimeter of the supporting rotor disk and is free to expand and contract without restraint from adjacent turbine rotor blades for minimizing stresses due to thermal expansion and contraction during operation. Since the turbine shrouds are suspended around the blade tips, relative expansion and contraction therebetween is permitted which correspondingly affects the size of the tip clearance.

The turbine nozzles and rotor blades are specifically designed in aerodynamic contour and flowpath dimensions for maximizing performance of the gas turbine engine. In the individual flowpaths between the nozzle vanes, a throat of minimum flow area is created with the flowpath converging to the throat and then diverging aft therefrom towards the corresponding row of turbine blades. Similarly, each flowpath defined between adjacent turbine blades also has a throat of minimum flow area, with the flowpath converging to the throat and then diverging in the downstream aft direction.

The inter-vane flowpaths are bound by the radially inner and outer integral bands. And the inter-blade flowpaths are bound by the integral blade platforms at the root of the airfoil and the radially outer turbine shroud.

Accordingly, the design of a modern gas turbine engine addresses in substantial detail the aerodynamic contours of the individual nozzle vanes and turbine blades from root to tip, as well as the corresponding aerodynamic contours of the inner and outer bands in the nozzle, and the platforms and turbine shrouds in the rotor stage. Modern three-dimensional computational techniques are now available for minutely analyzing the aerodynamic contours of all these components for maximizing engine performance.

However, the aerodynamic contours of the turbine nozzles and rotor stages are nevertheless subject to the small manufacturing tolerances of the individual components, and the small assembly tolerances when the components are mounted in the engine. These tolerances necessarily introduce random differences in the relative positions of adjacent components due to the independent assembly and mounting of these components. These random differences in final position correspondingly affect aerodynamic performance of the turbine, and in turn the overall efficiency of the engine.

In particular, the inboard surfaces of the inner and outer nozzle bands are precisely configured for maximizing aerodynamic performance of the nozzle, but the axial splitlines between adjacent nozzle segments affect nozzle performance. Since the nozzle vanes have typical airfoil configurations, they turn or bend the combustion gas flow during their axial downstream passage between the inter-vane flowpaths.

Accordingly, the combustion gases will firstly traverse the axial splitlines in one direction near the leading edges of the vanes and then traverse the same splitlines in an opposite direction near the trailing edges as the gas streamlines bend around the vanes during operation.

The flowpath surfaces of the inner and outer bands are manufactured for a nominally flush assembled position to ensure smooth flow of the combustion gas streamlines over the axial splitlines during operation. However, since the nozzle segments are subject to manufacturing and assembly tolerances, corresponding radial steps will be formed at the splitlines which will vary randomly in magnitude and direction within the small tolerances.

An up-step between nozzle segments will correspondingly obstruct combustion gas flow and reduce performance as well as locally heat the protruding step. A down-step is more desirable since it is subject to less heating from the combustion gases than an up-step, but nevertheless introduces a surface discontinuity which decreases efficiency.

Furthermore, since the combustion gas streamlines change direction as they flow over an individual splitline between the leading and trailing edges of the vanes, a desirable down-step at either the leading or trailing edges of the vanes will necessarily result in an undesirable up-step at the opposite side of the segment for nominally flush band designs.

Similarly, the turbine rotor blades have integral platforms which define the inner flowpath surface between the blades, which platforms are subject to similar steps between platforms subject to manufacturing and assembly tolerances.

The prior art includes various solutions for the inter-airfoil step problem in turbine nozzles and rotor stages. These solutions include providing chamfers on the platform or band edges, and varying the radial position of those edges to ensure primarily only down-steps as the flow streamlines bend in their downstream travel between the leading and trailing edges of the airfoils.

However, the use of chamfers and height changes in the platforms or bands correspondingly affects aerodynamic performance of the stator and rotor stages, and a compromise in design must be made for minimizing overall losses.

In particular, modern three-dimensional computational analysis now permits detailed design of the flowpath surfaces of the nozzle bands and blade platforms for maximizing efficiency of the inter-airfoil flowpaths. Changes in those flowpath surfaces should be eliminated or minimized in addressing the inter-airfoil stepping problem for maximizing efficiency of the engine.

Accordingly, it is desired to provide an inter-airfoil configuration in a gas turbine engine for resolving the steps between bands or platforms while minimizing aerodynamic contour changes of the bands and platforms themselves.

BRIEF DESCRIPTION OF THE INVENTION

A turbine airfoil includes opposite pressure and suction sides extending in span from a flowpath surface. The flowpath surface has chordally opposite forward and aft edges and laterally opposite first and second endfaces corresponding with the airfoil pressure and suction sides. The flowpath surface joins the first endface at the forward edge in a forward bullnose and joins the second endface at the aft edge in an aft bullnose, with the bullnoses varying in radius from the opposite edges.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
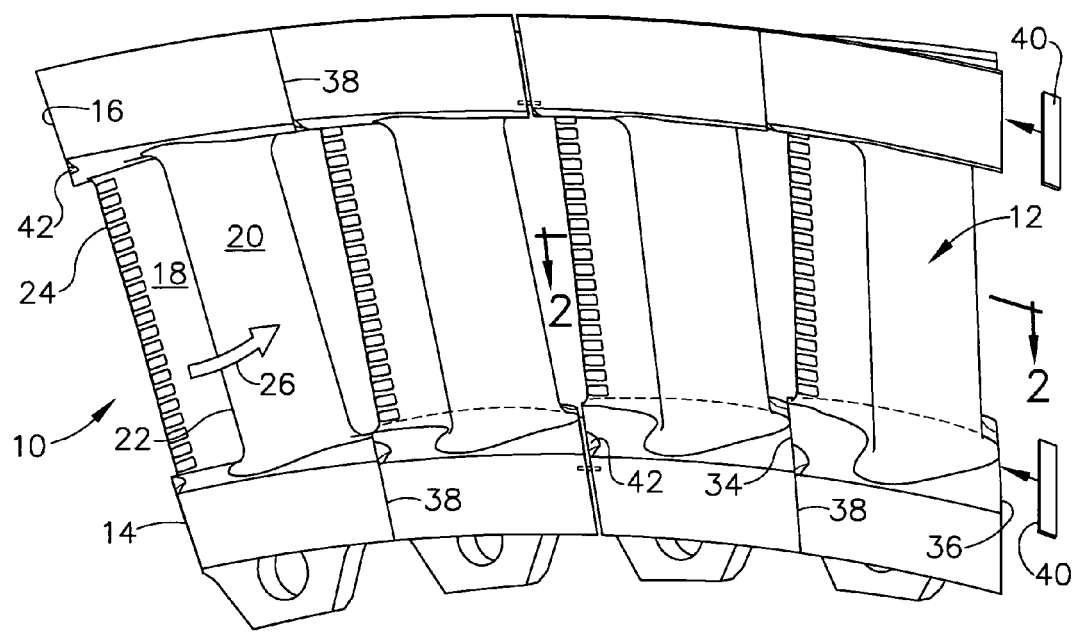
FIG. 1 is a forward-facing-aft elevational view of a portion of an annular first stage turbine nozzle in a gas turbine engine.

Illustrated in FIG. 1 is an arcuate portion of an annular first stage high pressure turbine nozzle 10 for a gas turbine engine. The nozzle is axisymmetric about the axial centerline axis of the engine and includes a plurality of hollow stator vanes 12 integrally joined at radially opposite root ends to radially inner and outer arcuate bands 14,16. For example, the individual vanes 12 may be cast with their corresponding inner and outer bands in a unitary configuration thereof.

Figure 2:
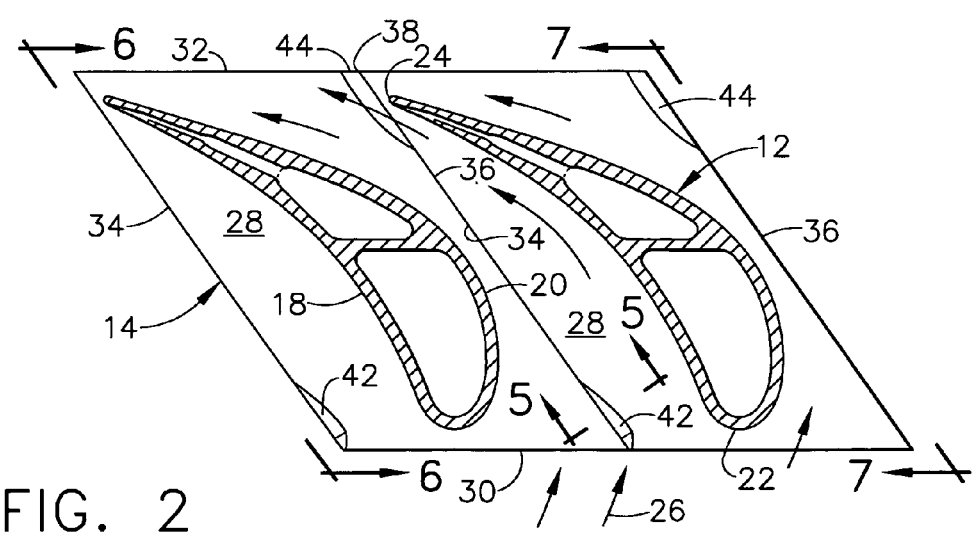
FIG. 2 is a radial sectional view through a portion of the nozzle illustrated in FIG. 1 and taken along line 2—2 illustrating the flowpath surface of the inner band.

As additionally illustrated in FIG. 2, each of the vanes 12 has an aerodynamic airfoil configuration with a generally concave pressure side 18, and a circumferentially or laterally opposite, generally convex suction side 20. The two sides extend axially in chord between opposite leading and trailing edges 22,24 which extend the full radial span of each vane airfoil between the two bands 14,16.

The individual vanes themselves may have any conventional configuration and typically include internal cooling circuits as illustrated in FIG. 2 through which is circulated during operation pressurized cooling air bled from the compressor (not shown) of the engine. The spent cooling air is discharged through various rows of film cooling holes and trailing edge outlets in the sidewalls of the vane.

During operation, hot combustion gases 26 are generated in a combustor (not shown) and are discharged therefrom into the corresponding flowpaths between the circumferentially adjoining vanes 12 as illustrated in FIGS. 1 and 2. The aerodynamic contours of the individual vanes and their angular orientations are determined in a conventional manner in which the streamlines of the combustion gases 26 as shown in FIG. 2 bend or curve in their downstream travel between the vanes and are discharged at the trailing edge thereof at a suitably oblique angle as required for maximizing performance in the downstream row of turbine rotor blades (not shown).

Each nozzle flowpath illustrated in FIG. 2 converges from the leading edges of adjacent vanes towards the trailing edges thereof, with a throat of minimum flow area typically being defined between the trailing edge of one vane to its normal projection on the suction side of an adjacent vane axially forward of the trailing edge thereof.

Figure 3:
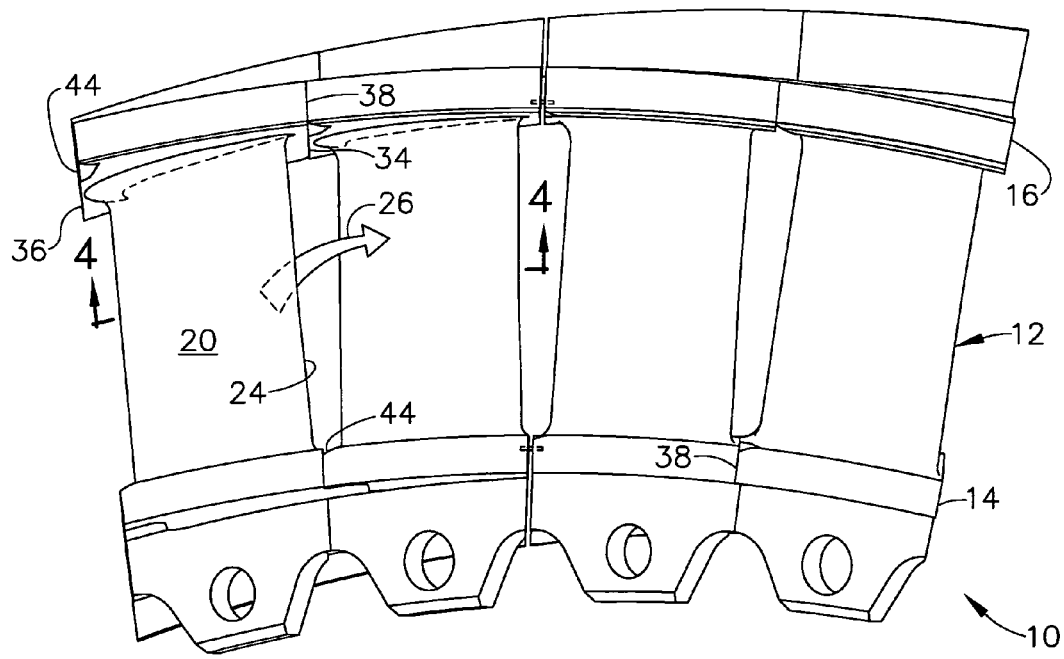
FIG. 3 is an aft-facing-forward elevational view of the nozzle segment illustrated in FIG. 1.

FIG. 3 illustrates the nozzle segment from its downstream or aft side showing discharge of the combustion gases 26 therefrom. And, FIG. 4, like FIG. 2, illustrates the aerodynamic profiles of the nozzle vanes which turn the combustion gases streamlines in a downstream direction through the corresponding flowpaths which are bound by the inner band 14 in FIG. 2 and the outer band 16 in FIG. 4.

Figure 4:
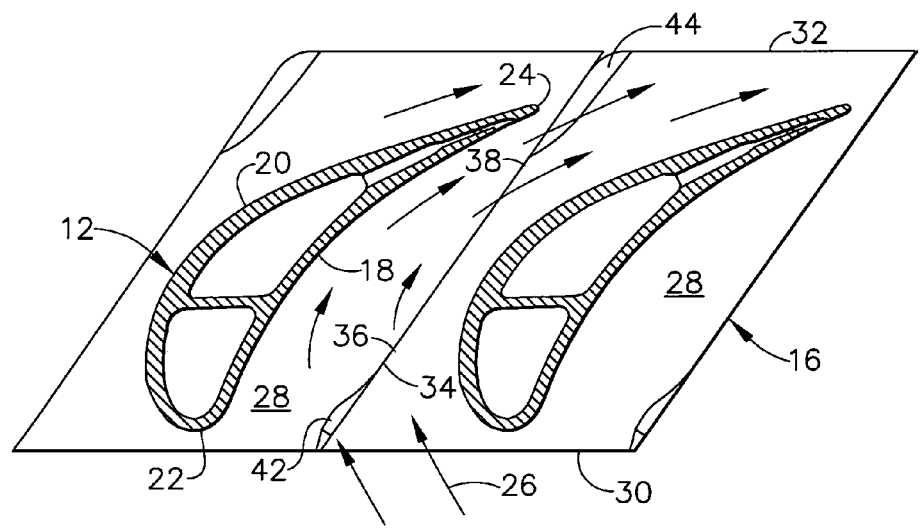
FIG. 4 is a radial sectional view through a portion of the nozzle illustrated in FIG. 3 and taken along line 4—4 to illustrate the flowpath surface of the outer band.

Since the two bands illustrated in FIGS. 2 and 4 bound the combustion gases at radially opposite ends they are generally similar in configuration, with the inner band 14 being circumferentially convex radially outwardly as illustrated in FIG. 1, and the outer band 16 being circumferentially concave radially inwardly to conform with the annular configuration of the assembled bands mounted in the engine.

The two bands 14,16 include corresponding flowpath surfaces 28 which surround the corresponding root ends of the vanes and face inboard toward each other to define the radially outer boundary of the inter-vane flowpath. In this way, the opposite flowpath surfaces 28 of the two bands confine the flow of the combustion gases 26 over the individual vanes, with the corresponding sides of the vanes providing the lateral flow boundaries for the individual inter-vane flowpaths.

As shown in FIGS. 2 and 4 the flowpath surfaces 28 commence and terminate at chordally or axially opposite forward and aft edges 30,32, which are in the form of radial flanges in the nozzle configuration. The forward edge 30 extends in the circumferential direction near the vane leading edge 22 and the aft edge 32 extends in the circumferential direction near the trailing edge 24.

Each flowpath surface 28 also terminates circumferentially or laterally at opposite first and second endfaces 34,36 corresponding with the vane pressure and suction sides 18,20, respectively. As shown in FIGS. 2 and 4, the four sides or edges of each flowpath 28 forms a general parallelogram in profile and conforms with the angular position of the individual vanes 12 integrally formed therewith.

The turbine nozzle illustrated in FIGS. 1–4 is initially manufactured by integrally casting the individual vanes 12 with their corresponding inner and outer bands 14,16 in unitary singlet assemblies. The singlets are then joined together in the annular configuration of the resulting turbine nozzle.

In the exemplary embodiment illustrated, the singlets are preferably first grouped in pairs to form integral nozzle doublets wherein the corresponding inner and outer bands 14,16 are brazed together at corresponding braze joints 38 at adjoining first and second endfaces 34,36 of the two bands. The braze joints 38 seal together the inner band segments between two vanes and the outer band segments of the same two vanes to create each nozzle doublet.

The nozzle doublets are then suitably supported in the engine to form the complete nozzle ring thereof, with conventional spline seals 40 being inserted in corresponding slots formed in the exposed endfaces 34,36. The spline seals are loosely trapped in the endface slots and provide effective flow seals thereat, while also permitting relative expansion and contraction between the mounted doublets.

Figure 5:
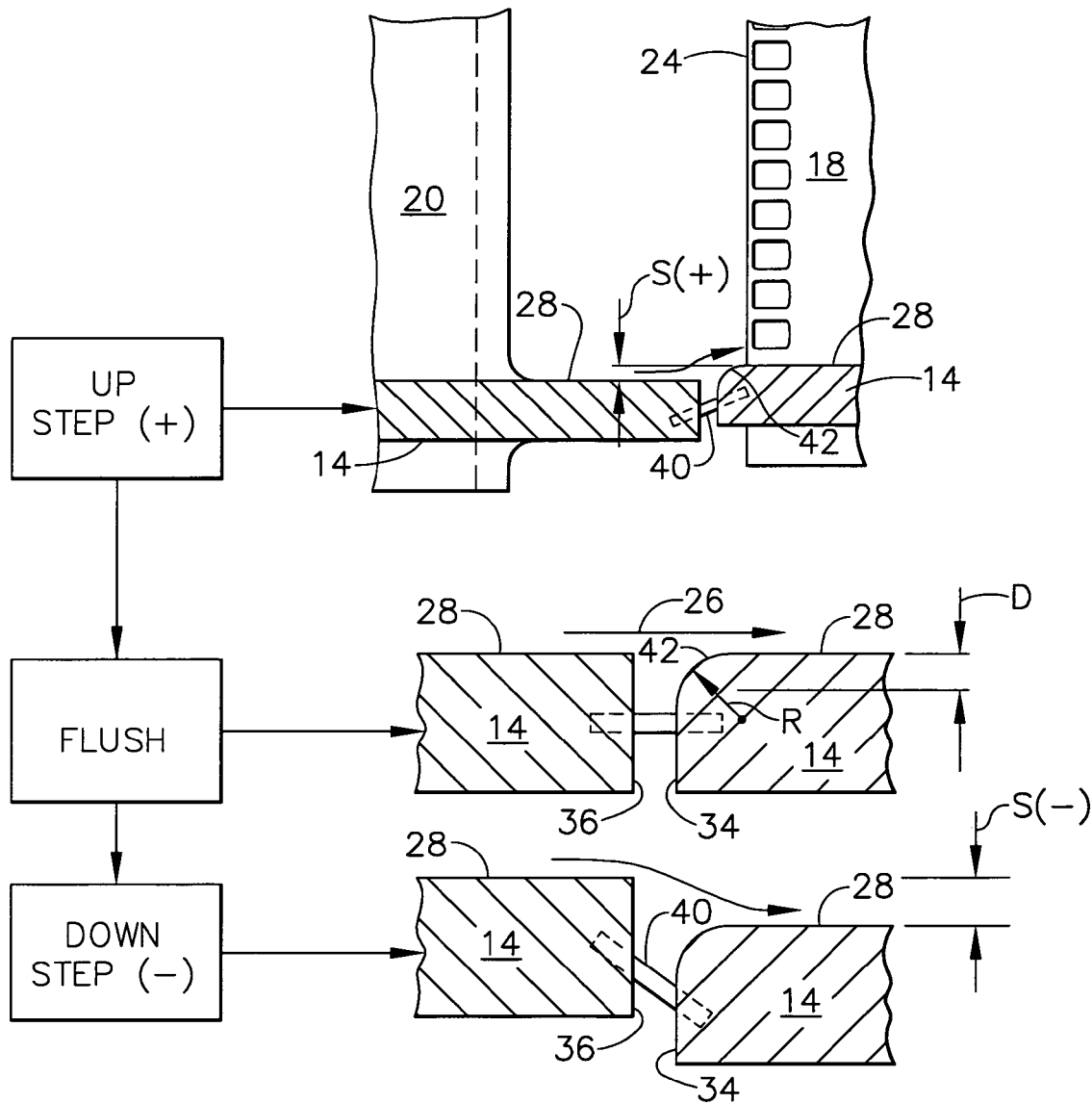
FIG. 5 is a schematic representation of the inter-band splitline joint between the band segments illustrated in FIG. 2 and taken along line 5—5.

FIG. 5 illustrates schematically an exemplary spline seal 40 joining two adjacent endfaces 34,36 along the corresponding axial splitline of the inner band 14, with a similar joint also being found in the outer band. As indicated above, each nozzle singlet is subject to manufacturing tolerances of a few mils in the dimensions and positions of the various surfaces thereof including in particular the flowpath surfaces 28 which bound the combustion gases radially inwardly at the inner band 14 and radially outwardly at the outer band 16. When the singlets are brazed together in the nozzle doublet, additional assembly tolerances of a few mils also compound the original manufacturing tolerances of the casting process.

Furthermore, the nozzle doublets are mechanically mounted in the engine in a full ring, typically to a supporting casing or ring, and introduce further assembly tolerances of several mils as well. Accordingly, when the full complement of nozzle vanes are arranged in the complete nozzle, the individual flowpath surfaces 28 of the bands as illustrated for example in FIG. 5, are generally aligned circumferentially at nominally common diameters from the centerline axis of the engine.

However, the manufacturing and assembly tolerances will create random differences in the radial position of the adjacent inner and outer bands thusly creating either positive up-steps (S+) or negative down-steps (S−) between the adjacent flowpath surfaces 28 which bound the combustion gases 26.

Further complicating the assembly of the nozzle segments is the turning of the combustion gas streamlines as illustrated schematically in FIGS. 2 and 4 as they first pass in one direction over the axial splitline near the leading edges of the vanes and then change direction and again flow over the same axial splitlines near the trailing edges of the vanes.

Accordingly, the difference in radial position of the adjacent flowpath surfaces 28 which occur randomly from the manufacturing and assembly tolerances will create steps in the otherwise nominally flush flowpath surfaces 28. Since the combustion gas streamlines change direction along the splitlines, the radial step will form either an up-step S (+) or a down-step S (−).

Although both types of steps introduce local discontinuities in the combustion gas flow and corresponding losses therefrom, the up-step is particularly undesirable because it locally obstructs the free flow of the combustion gases, and is subject to increased thermal loads therefrom.

Since the original flowpath surfaces 28 are constrained by the desired configuration of the inter-vane flowpaths for maximizing turbine efficiency, it is undesirable to change the configuration or profile thereof. However, the flowpath surfaces 28 may be locally tailored along the axial splitlines of the adjoining endfaces 34,36 to specifically address the randomly found steps in elevation thereat for reducing the adverse aerodynamic and thermal consequences.

More specifically, each of the flowpath surfaces 28 of the inner and outer bands joins the respective first endface 34 at the forward edge 30 in a first or forward bullnose 42 as best illustrated in FIGS. 2 and 4, and also joins the second endface 36 at the aft edge 32 in a second or aft bullnose 44. The bullnoses 42,44 are external rounded corners of finite size for minimizing the adverse consequences of the resulting up or down-steps which randomly occur at the axial splitlines.

FIG. 5 illustrates schematically the three possible orientations of the adjacent bands, with the inner band 14 being illustrated, but with the same Figure being equally applicable to the outer band 16 as well. Notwithstanding the manufacturing and assembly tolerances, two adjacent bands may be aligned with their corresponding flowpath surfaces 28 being flush or in level plane for permitting the smooth flow of the combustion gases 26 thereover.

Alternatively, the downstream band may be slightly higher in elevation than the upstream band to create the up-step S (+) represented by the difference in radial elevation of the adjacent flowpath surfaces 28. The up-step exposes the corner of the downstream endface to the combustion gases which are locally obstructed thereby and increase the thermal loading thereof.

Alternatively, the downstream band may be disposed at a lower elevation than the upstream band creating the down-step S (−) in which the difference in radial elevation of the adjacent flowpath surfaces 28 causes the combustion gases to drop along the surfaces in the downstream direction.

By introducing the rounded bullnoses 42,44 in preferential configurations and locations along the axial splitlines illustrated in FIGS. 2, 4, and 5, the adverse aerodynamic and thermal effects of the steps may be reduced for the up-step in particular, without adversely affecting either the flush or down-step configurations.

Figure 6:
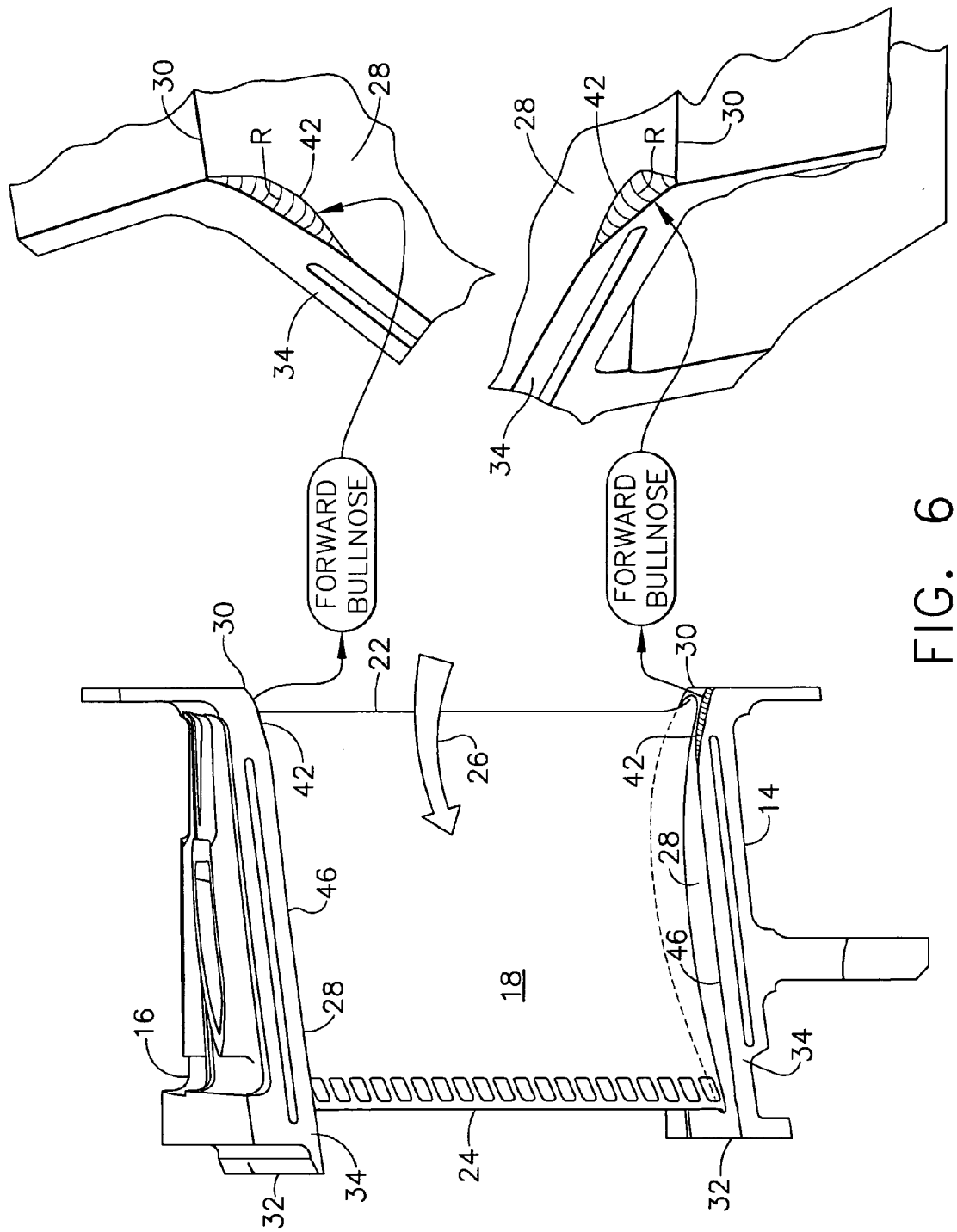
FIG. 6 is a side elevational view of the nozzle segment illustrated in FIG. 2 and taken along line 6—6 for illustrating in particularity forward bullnoses on the pressure side band endfaces.
Figure 7:
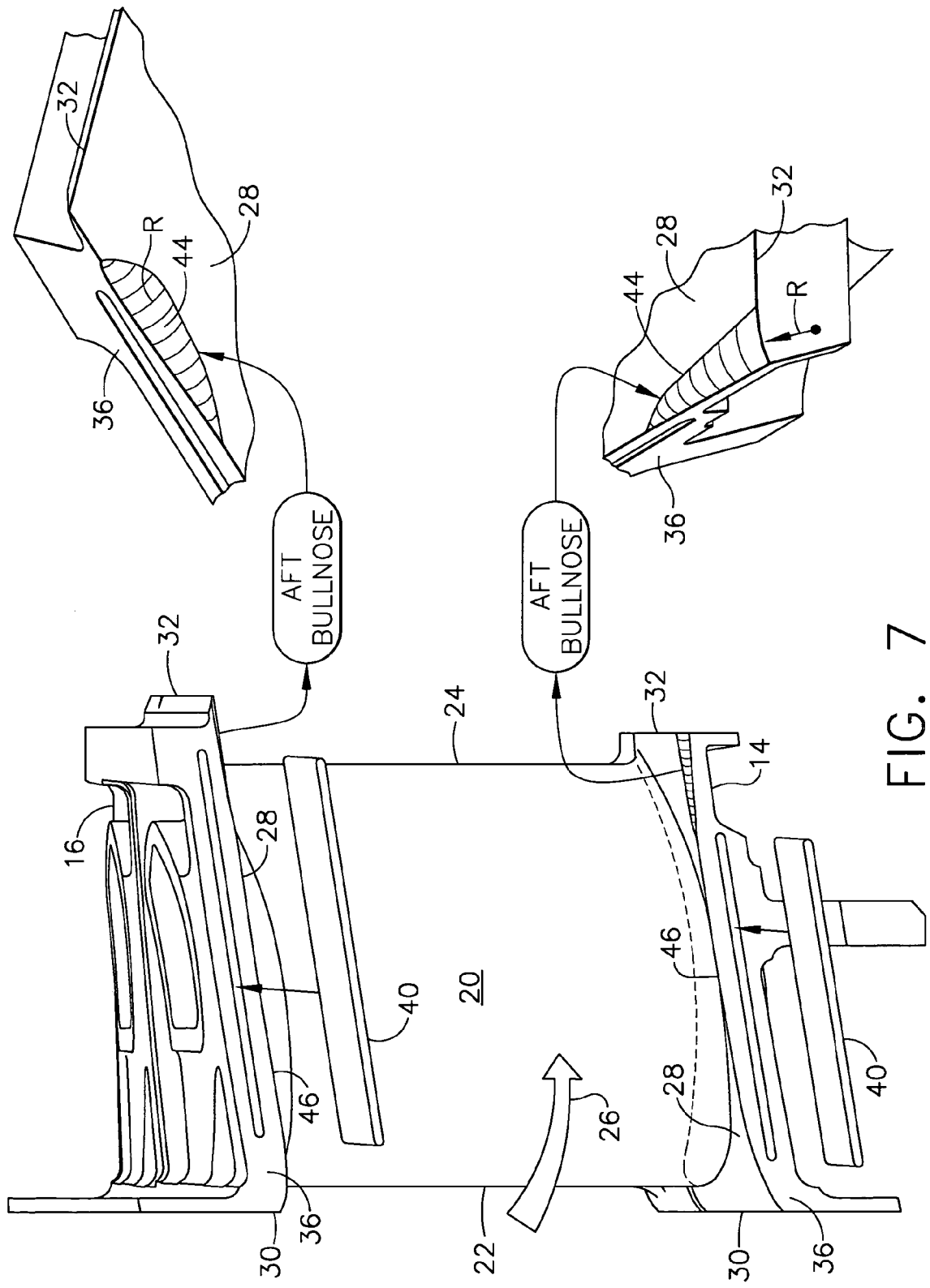
FIG. 7 is a side elevational view of the nozzle segment illustrated in FIG. 2 and taken along line 7—7 to illustrate aft bullnoses on the suction side band endfaces.

For the turbine nozzle embodiment illustrated in FIGS. 1–5, similar forward and aft bullnoses 42,44 are disposed in both the radially inner and outer bands 14,16 at corresponding endfaces thereof for reducing the adverse effects of the resulting inter-airfoil steps produced in the manufacturing and assembly tolerances of the full complement of the turbine airfoils. Exemplary configurations of the bullnoses 42,44 are illustrated in FIGS. 6 and 7, and are similarly located in local portions of the corresponding endfaces, with the bullnoses preferentially varying in size or radius R away from the corresponding forward and aft edges 30,32 at which they commence.

As initially illustrated in FIG. 5, the forward and aft bullnoses are specifically introduced to extend in depth D below the corresponding flowpath surfaces 28 of the respective bands. As indicated above, the flowpath surfaces 28 are initially designed for maximizing aerodynamic performance of the corresponding flowpaths between the turbine vanes. The profile and configuration of those flowpath surfaces is therefore predefined. Those flowpath surfaces 28 as indicated schematically in FIG. 5 are also designed for nominal placement in the installed nozzle segments for being flush from vane to vane around the circumference of the entire nozzle.

Accordingly, without adversely affecting the intended nominal position of the flowpath surfaces themselves, the corresponding bands are locally modified to introduce the forward and aft bullnoses 42,44 in depth D only around the corresponding corners between the flowpath surfaces and the endfaces 34,36.

The rounded configuration of the bullnoses illustrated in FIG. 5 thusly provides an aerodynamically smooth transition for the illustrated up-step which smoothly guides the combustion gases over the step to the next adjacent flowpath surfaces 28. For the nominally flush flowpath surfaces 28 also illustrated in FIG. 5, the bullnoses are recessed below the adjacent flowpath surfaces 28 and still provide an aerodynamically smooth transition therebetween. And, for the down-step configuration also illustrated in FIG. 5, the bullnoses are further recessed between the offset flowpath surfaces, and yet still provide a smooth aerodynamic junction therebetween.

As indicated above with respect to FIGS. 2 and 4, the nominally flush flowpath surfaces 28 between adjacent bands can randomly form steps in elevation between the two bands which are nominally the same height over the full axial extent of the axial splitlines. Accordingly, the up-step illustrated in FIG. 5 may occur at the forward bullnose 42 illustrated in FIG. 2 for example, with a corresponding down-step being simultaneously introduced at the aft bullnose 44 along the same splitline due to the changing direction of the combustion gas streamlines.

Correspondingly, the forward bullnose 42 illustrated in FIG. 2 may be subject to the initial down-step illustrated in FIG. 5, with the aft bullnose 44 then being subject to the corresponding up-step illustrated in FIG. 5 along the same axial splitline, yet again due to the change in direction of the common combustion gas flow streamlines.

In this configuration, the flowpath surfaces 28 may remain at their designed-for conditions, with the random generation of radial elevation changes therebetween and the corresponding steps being accommodated by the specifically tailored forward and aft bullnoses 42,44 located solely at the corresponding ends of the axial splitline.

As illustrated in FIG. 6, the forward bullnoses 42 in the two bands taper smaller in size or radius R axially from the forward edges 30 toward the aft edges 32. Correspondingly, the aft bullnoses 44 illustrated in FIG. 7 similarly taper smaller in size or radius axially from the aft edges 32 toward the forward edges 30.

As also shown in FIGS. 6 and 7, the first and second endfaces 34,36 in each of the inner and outer bands 14,16, each includes a major section 46 which is devoid of the corresponding forward and aft bullnoses 42,44, with those bullnoses being located along only a corresponding minor portion of the endfaces. The major sections 46 illustrated in FIG. 6 extend from the corresponding forward bullnoses continuously to the corresponding aft edges 32 for substantially over the half length of the corresponding endfaces, including the middle sections thereof.

Similarly, the major sections 46 along the second endfaces 36 illustrated in FIG. 7 extend continuously from the aft bullnoses 44 to the forward edges 30 substantially more than half of the length of the endfaces, including the middle sections thereof as well.

In this configuration, the forward bullnoses 42 commence at the forward edge 30 and taper smaller in size and terminate before reaching the axial middle or midspan of the first endface 34. The aft bullnoses 44 similarly commence at the aft edge 32 and taper smaller in size and terminate before reaching the middle of the second endface 36.

In this way, the corresponding flowpath surfaces 28 may remain in nominal configuration and position as intended for maximizing aerodynamic performance of the turbine nozzle, with the bullnoses 42,44 being introduced locally along the endfaces and terminating promptly as they approach the middle of the flowpath surfaces where the combustion gas streamlines run generally parallel with the axial splitlines as they change directions between the leading and trailing edges of the vanes.

The actual axial length of the individual bullnoses 42,44 is controlled by the specific design of the turbine nozzle and the local direction of the combustion gas streamlines. In most cases, the bullnoses will be largest in size near the corresponding forward and aft edges of the flowpath surface and decrease in size quickly before reaching the middle sections of the axial splitlines.

In the exemplary embodiment illustrated in FIGS. 6 and 7, the forward and aft bullnoses 42,44 have a collective axial length along the corresponding endfaces 34,36 which is less than about half of the axial length of each of those endfaces along the corresponding axial splitlines. The bullnoses are therefore relatively short and introduced in substantially minor portions of the axial splitlines.

As illustrated in FIGS. 5–7, the forward and aft bullnoses 42,44 are preferably circular arcs of radius R which bridge the corresponding flowpath surfaces 28 and endfaces 34,36. Circular arcs are more easily manufactured, for example by being initially cast into the corresponding bands. The circular arcs of the bullnoses decrease in radius from the corresponding forward and aft edges of the flowpath surfaces toward the middle of the endfaces, and terminate in a substantially zero radius.

Since the individual nozzle singlets are initially cast, the initially cast endfaces 34,36 are typically machined for achieving the final dimensions thereof and flat surface finish for forming a tight axial splitline between adjacent bands. Machining of the cast endfaces will also machine away a portion of the corresponding cast bullnoses, nevertheless leaving portions of the circular arcs thereof which decrease in size as they taper smaller where they terminate and blend in the originally machined endfaces having relatively sharp corners with the corresponding flowpath surfaces.

FIG. 6 illustrates an exemplary embodiment of the inner and outer bands 14,16, with the corresponding flowpath surfaces 28 terminating at corresponding radial flanges of the bands in a conventional configuration. The inner band also includes an intermediate radial flange which is used for mounting the nozzle segments to a supporting casing or ring.

Accordingly, the flowpath surfaces 28 of both bands terminate at the corresponding forward edges 30 in an exemplary bellmouth configuration. The forward bullnose 42 of the inner band 14 commences at the forward edge 30 preferably with a maximum radius and then decreases in radius continuously to the termination thereof before reaching the midspan of the band. This forward bullnose 42 correspondingly varies in size as its opposite ends taper and blend along the first endface 34.

The forward bullnose 42 of the outer band 16 also tapers and blends at its opposite ends, initially increasing in size and radius from the forward edge 30 to a maximum size and radius before terminating along the first endface 34.

For example, the maximum radius of the forward bullnoses may be about 125–150 mils and decreases to a substantially zero radius along the endfaces. In view of the bellmouth configuration of the inlet ends of the flowpath surfaces, the corresponding forward bullnoses blend therewith to provide an aerodynamically smooth contour over which the combustion gases flow in the downstream direction thereover.

FIG. 7 illustrates the aft bullnoses 44 near the aft edges 32 of the inner and outer bands. In this embodiment, the inner band 14 ends at a radial flange, and the aft bullnose 44 may commence at that flange with maximum size or radius, of about 140 mils for example, and decreases in size or radius toward the midspan.

The outer band 16 illustrated in FIG. 7 is configured for being suspended between adjacent components in the turbine, and the flowpath surface 28 thereof terminates at the aft edge 32 in the form a sharp angel wing of conventional configuration. Correspondingly, the aft bullnose 44 for the outer band preferably commences before or short of the angel wing in a locally thicker region of the band and then increases initially in size and radius, to about 140 mils for example, before decreasing in size and radius towards the termination thereof before the midspan.

The various embodiments of the forward and aft bullnoses illustrated in FIGS. 6 and 7 provide external corners between the flowpath surfaces and the corresponding endfaces and are locally tailored for the contour of the flowpath surfaces at the opposite ends of the bands and the configurations of the corresponding opposite edges of those bands. Since the bullnoses require removal of local portions of the bands below the nominal flowpath surfaces thereof they are preferentially introduced where space permits and without leaving excessively thin portions of the bands themselves.

The specifically configured and locally introduced varying contour bullnoses substantially reduce the adverse aerodynamic and thermal effects of differences in radial elevation of the corresponding flowpath surfaces in the inner and outer bands due to manufacturing and assembly tolerances.

The middle portions of the axial splitlines illustrated in FIGS. 2 and 4 remain original to the corresponding flowpath surfaces 28 and any steps between adjacent bands in the middle region have relatively small adverse affect due to the generally parallel flow of the combustion gas streamlines. However, those streamlines change in direction near the forward and aft ends of the bands in which the forward and aft bullnoses are preferentially located and preferentially tapered for maximizing their benefit.

As indicated above, FIGS. 1–4 also illustrate that the nozzle singlets may be brazed together to form doublets which in turn are joined together by the spline seals 40. In this configuration, the inboard endfaces of the two singlets are brazed together at the braze joint 38 without spline seals thereat, and the forward and aft bullnoses 42,44 are also disposed at the braze joint to form local notches between the adjacent flowpath surfaces 28 integrally joined together by the braze joint.

Since brazing together of the two singlets in the corresponding doublet requires additional assembly tolerances, additional steps at the braze joints will also be generated randomly and vary in size. The forward and aft bullnoses may nevertheless be introduced also at the braze joints in addition to the spline joints for providing additional advantage thereat in reducing the adverse aerodynamic and thermal effects of the up-steps in particular.

Although the variable bullnoses disclosed above have particular utility in turbine nozzles, they may also be introduced in turbine rotor blades having integral root platforms which correspond with the inner bands disclosed above. When rotor blades are mounted to the perimeter of a supporting rotor disk, the blade platforms are configured for nominally flush alignment of the radially outer flowpath surfaces thereof. The corresponding endfaces between those platforms may be modified to introduce the forward and aft bullnoses for similar benefit therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A turbine nozzle comprising:
a plurality of vanes joined to inner and outer bands, with corresponding first and second endfaces of said bands being joined together by spline seals;
said bands including flowpath surfaces surrounding opposite ends of said vanes to confine flow of combustion gases between said vanes, and said flowpath surfaces terminating axially at forward and aft edges and circumferentially at first and second endfaces; and
each of said flowpath surfaces in said inner and outer bands join said first endface at said forward edge in a forward bullnose and join said second endface at said aft edge in an aft bullnose, and said bullnoses continuously vary in size from said opposite edges.

2. A nozzle according to claim 1 wherein said bullnoses extend in depth below said flowpath surfaces.

3. A nozzle according to claim 2 wherein said forward bullnoses taper smaller in size from said forward edge toward said aft edge, and said aft bullnoses taper smaller in size from said aft edge toward said forward edge.

4. A nozzle according to claim 3 wherein said forward bullnoses commence at said forward edge and terminate before the middle of said first endface, and said aft bullnoses commence at said aft edge and terminate before the middle of said second endface.

5. A nozzle according to claim 4 wherein said first and second endfaces in said inner and outer bands each includes a major section devoid of said bullnoses, and said major section is greater in length than each of said bullnoses.

6. A nozzle according to claim 5 wherein said flowpath surfaces terminate at said forward edge, and said forward bullnoses commence at said forward edge, have a maximum radius, and decrease in radius continuously to the termination thereof.

7. A nozzle according to claim 5 wherein said flowpath surfaces of said outer bands terminate at said aft edge in a sharp angel wing, and said aft bullnoses commence short of said angel wing and increase in size before decreasing in size toward the termination thereof.

8. A nozzle according to claim 7 wherein said flowpath surfaces of said inner bands terminate at said forward edge, and said forward bullnoses commence at said forward edge with a maximum radius and decrease in radius continuously to the termination thereof.

9. A nozzle according to claim 5 wherein said forward and aft bullnoses comprise circular arcs bridging said flowpath surfaces and said endfaces, and said arcs decrease in radius toward the middle of said endfaces and terminate in a substantially zero radius.

10. A nozzle according to claim 5 wherein said vanes are disposed in pairs, with said inner and outer bands thereof being brazed together at corresponding ones of said first and second endfaces, and said forward and aft bullnoses thereof create local notches between adjacent flowpath surfaces.

11. A turbine nozzle comprising:
a vane integrally formed at opposite ends to inner and outer bands;
said vane including laterally opposite pressure and suction sides extending in chord between opposite leading and trailing edges;
said bands including flowpath surfaces surrounding said vane ends to confine flow of combustion gases over said vanes, and said flowpath surfaces terminating at chordally opposite forward and aft edges and laterally opposite first and second endfaces corresponding with said vane pressure and suction sides; and
said flowpath surface joins said first endface at said forward edge in a forward bullnose and joins said second endface at said aft edge in an aft bullnose, and said bullnoses vary in radius from said edges.

12. A nozzle according to claim 11 wherein said bullnoses extend in depth below said flowpath surface.

13. A nozzle according to claim 12 wherein said forward bullnose tapers smaller in size from said forward edge toward said aft edge, and said aft bullnose tapers smaller in size from said aft edge toward said forward edge.

14. A nozzle according to claim 13 wherein said forward bullnose commences at said forward edge and terminates before the middle of said first endface, and said aft bullnose commences at said aft edge and terminates before the middle of said second endface.

15. A nozzle according to claim 14 wherein said forward and aft bullnoses have a collective length along said endfaces which is less than about half of the length of said endfaces.

16. A nozzle according to claim 14 wherein said flowpath surface terminates at said forward edge, and said forward bullnose commences at said forward edge, has a maximum radius, and decreases in radius continuously to the termination thereof.

17. A nozzle according to claim 14 wherein said flowpath surface terminates at said aft edge in a sharp angel wing, and said aft bullnose commences short of said angel wing and increases in size before decreasing in size toward the termination thereof.

18. A nozzle according to claim 14 wherein said forward and aft bullnoses are disposed in both said inner and outer bands.

19. A nozzle according to claim 14 wherein said forward and aft bullnoses comprise circular arcs bridging said flowpath surface and said endfaces, and said arcs decrease in radius toward the middle of said endfaces and terminate in a substantially zero radius.

20. A nozzle according to claim 14 comprising a pair of said vanes and integral inner and outer bands brazed together at said inner and outer bands along adjoining first and second endfaces thereof, and said forward and aft bullnoses create local notches with adjacent flowpath surfaces.

21. A turbine airfoil comprising:
opposite pressure and suction sides extending in chord between opposite leading and trailing edges, and in span from a root at an integral platform;
said platform having a flowpath surface surrounding said airfoil root, and said flowpath surface terminating at chordally opposite forward and aft edges and laterally opposite first and second endfaces corresponding with said airfoil pressure and suction sides; and
said flowpath surface joins said first endface at said forward edge in a forward bullnose and joins said second endface at said aft edge in an aft bullnose, and said bullnoses continuously vary in radius from said edges.

* * * * *